US012712947B1

(12) United States Patent
Zhang et al.

(10) Patent No.: US 12,712,947 B1
(45) Date of Patent: Aug. 18, 2026

(54) CONTEXT PROPAGATION IN SERVICE-ORIENTED ARCHITECTURE VIA AUTHORIZATION LIBRARIES

(71) Applicant: Amazon Technologies, Inc., Seattle, WA (US)

(72) Inventors: Honghui Zhang, Basking Ridge, NJ (US); Brad Boswell, Seattle, WA (US); Usman Mansoor, Cranbury, NJ (US); Yihao Li, New York, NY (US); Andrew Stewart Lochbaum, Andrew, TX (US); William Leslie Kruger, Westford, MA (US); Joji Jacob, Maple Valley, WA (US); Nikita Smyrnov, Seattle, WA (US); Yu Xin Xue, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 607 days.

(21) Appl. No.: 18/120,924

(22) Filed: Mar. 13, 2023

(51) Int. Cl.
*H04L 67/51* (2022.01)

(52) U.S. Cl.
CPC .................................... *H04L 67/51* (2022.05)

(58) Field of Classification Search
CPC ...................................................... H04L 67/51
See application file for complete search history.

(56) References Cited

U.S. PATENT DOCUMENTS

2004/0034797 A1* 2/2004 Becker Hof ............ H04L 61/35 726/4
2015/0381776 A1* 12/2015 Seed ..................... H04L 5/0055 709/203
2017/0019487 A1* 1/2017 Maheshwari ........... H04L 67/51
2017/0308419 A1* 10/2017 Lazier ..................... G06F 9/547
2017/0346704 A1* 11/2017 Strijkers ............. H04L 41/5054
2018/0024901 A1* 1/2018 Tankersley ....... G06Q 10/06393 707/694
2020/0014663 A1* 1/2020 Chen ................... G06F 9/45558
2024/0235959 A1* 7/2024 Browne ............. H04L 41/5025

* cited by examiner

*Primary Examiner* — Tonia L Dollinger
*Assistant Examiner* — Mehulkumar J Shah
(74) *Attorney, Agent, or Firm* — Kilpatrick Townsend & Stockton LLP

(57) ABSTRACT

Techniques for context propagation of context propagation in service-oriented architecture are described herein. For example, a computer system can receive an incoming request by a first service and from a client device. The incoming request can include a context token in a first header of the incoming request, and the context token can be stored in a context storage. The computer system can determine, by the first service, that fulfilling the incoming request can involve calling a second service. In response, the computer system can request, by the first service, the context token for the incoming request from the context storage. The first service can generate an outgoing request to a second service, and a second header of the outgoing request can include the context token. The second service can generate an output for the outgoing request based at least in part on the context token.

20 Claims, 8 Drawing Sheets

CONTEXT PROPAGATION IN SERVICE-ORIENTED ARCHITECTURE VIA AUTHORIZATION LIBRARIES

BACKGROUND

Applications executing in a service-oriented architecture can include multiple services forming a chain or web via dependency calls. Each service can provide a functionality for the application. The services may communicate with one another and make dependency calls to fulfill requests for the application. For instance, a first service in an application can process a request by making a dependency call to a second service. The second service can return a requested functionality or data to the first service to be used in fulfilling the request.

BRIEF DESCRIPTION OF THE DRAWINGS

Various embodiments in accordance with the present disclosure will be described with reference to the drawings, in which.

DETAILED DESCRIPTION

Figure 1:
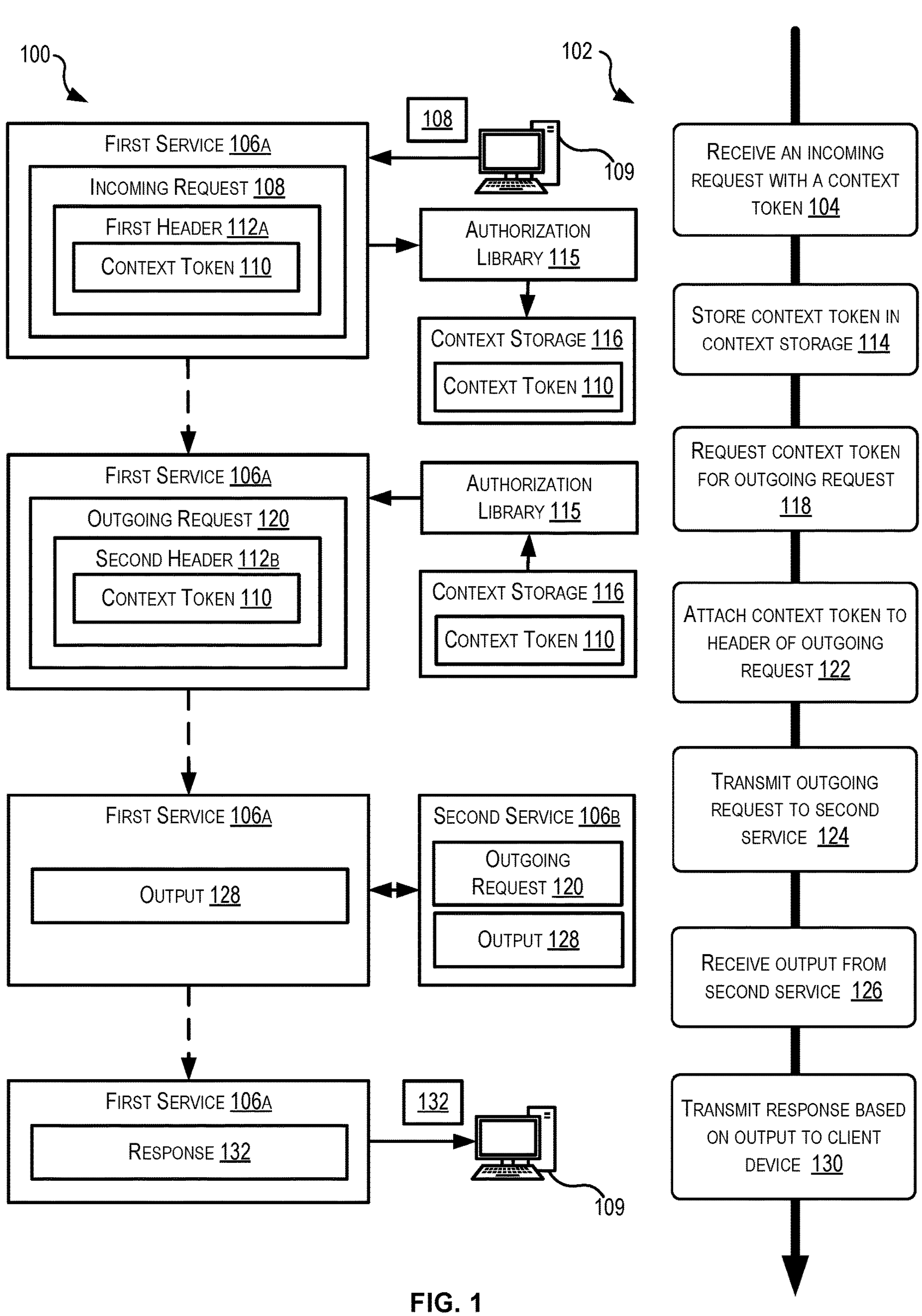
FIG. 1 illustrates an example block diagram and associated flowchart showing a process for implementing techniques relating to propagating context tokens between services, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, techniques for propagating context between services in service-oriented architectures. Typically, it can be challenging to propagate contextual information (such as customer identification, line of business information, external request identification) in a network of services. Context propagation may be critical in fulfilling legal and security requirements. For instance, a data custodian service may use customer identification (e.g., username and password) to make an authorization decision for a transaction. The customer identification may be sent by the customer to a frontend service. But the frontend service may not be authorized to securely pass the customer identification directly to the data custodian service. Instead, the frontend service may pass the customer identification to several intermediate services that can securely propagate the customer identification to the data custodian service. Requiring additional services to propagate information can negatively impact latency for the network of services. Alternatively, application code for the services can be modified to allow the services to directly pass context information. But, altering application code for entities with substantial amounts of services may be time-consuming and computationally expensive. For instance, modifying application code for an entity with over 10,000 services may not be feasible.

Turning now to a particular example, a system is provided that includes a network of services. Multiple services in the network can be chained together to fulfil an incoming request received from a client device. An initial service that receives the incoming request may be a frontend service such as a login webpage. The incoming request can include context information, such as a username and password for a user of the client device. The context information may be included in a header of the incoming request. Or, the frontend service may request that a context service generate the context information and attach the context information to the header of the incoming request. The incoming request may be a request to access a secure webpage. Because the frontend service may utilize additional services that may need the context information to fulfill the request, the context information can be stored in context storage by an authorization library that intercepts the incoming request. The initial service may be unable to authenticate the username and password. So, the initial service may determine that an intermediate service such as a validator service is needed to fulfill the incoming request. Rather than using several context propagation services to propagate the context information to the validator service, the initial service can request the context propagation from the context storage. The authorization library, which already has permission to attach tokens to request headers, can attach the username and password to a header of an outgoing request (e.g., an HTTP header). The initial service can then transmit the outgoing request, including the username and password, to the validator service to request validation of the username and password. The validator service may compare the username and password to a stored username and password to determine that the user has entered valid login credentials. Therefore, the validator service can transmit an output indicating the validation decision back to the initial service. Because the username and password were approved, the initial service can grant the client device access to the secure webpage. In this way, context information can be propagated between chained services without modifying code for either service, or without requiring the use of intermediate services that are used only to propagate the context information.

The techniques described herein improve the functioning of computer systems such as service provider systems that utilize service-oriented architecture. Typically, authorization libraries can already interact with request headers (e.g., to propagate authorization tokens). The authorization library can therefore be modified to intercept and attach context tokens to requests transmitted between services. Modifying the authorization library can be significantly less resource intensive than modifying most or all services in a service network. This can also avoid increases in latency, networking resource usage, failure points, and security vulnerabilities associated with using a chain of intermediate services that are used solely to propagate context tokens. The intermediate services may not perform any functions beyond propagating the context token. Each propagation of the context token between services can increase latency in the application. Further, each additional intermediate service needed to propagate the context token from an initial service and a final service can introduce a potential failure point. All intermediate services must successfully propagate the context token for the incoming request to be fulfilled. In contrast, when using the authorization library to propagate context, the latency impact can be very minimal, such as less than 1 millisecond. Further, use of the authorization library to propagate context tokens is programming language agnostic.

Turning now to the figures, FIG. 1 is an example block diagram of a system 100 and associated flowchart showing a process 102 for implementing techniques relating to propagating context tokens between services, according to at least one example. The system 100 includes devices, objects, and the like that correspond to the process 102. The process 102 can be performed by a first service 106*a*, which may be implemented in a server computer to fulfill incoming requests 108 received from client devices 109. In some examples, an incoming request 108 may be responded to in the form of webpages, web services, and the like.

FIGS. 1, 4, 5, and 6 illustrate example flow diagrams showing respective processes 102, 400, 500, and 600, as described herein. The processes 102, 400, 500, and 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the processes 102, 400, 500, and 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 by the first service 106*a* receiving an incoming request 108 from the client device 109. The client device 109 may be a user device or a device executing a service that calls the first service 106*a*. In some examples, the incoming request 108 can include a first header 112*a* in which a context token 110 is stored. In other examples, the first service 106*a* may access a service, such as a context service, to generate a context token 110 for the incoming request 108 and attach the context token 110 to the first header 112*a*. The context token 110 can include or represent contextual information that may be used to fulfill the incoming request 108. For example, the incoming request 108 may request purchase of an item using transaction credentials. The context token 110 can indicate the item being purchased, the transaction credentials, and a location of the client device 109.

At block 114, the process 102 includes an authorization library 115 storing the context token 110 in a context storage 116. The authorization library 115 can intercept the incoming request 108 to retrieve the context token 110 because the authorization library 115 may already have permissions to access headers 112 for incoming requests 108. The context token 110 can be stored in the context storage 116 in association with the incoming request 108. For example, the context token 110 may be stored as a thread local variable to ensure that the context token 110 can only be accessed by the same thread as the incoming request 108.

At block 118, the first service 106*a* may request the context token 110 for an outgoing request 120. The first service 106*a* may generate the outgoing request 120 in response to determining that a second service 106*b* is needed to fulfill the incoming request 108. For example, the first service 106*a* can process the transaction requested in the incoming request 108, but may need to determine if the transaction is allowed based on the location of the client device 109. The second service 106*b* can access location regulations for transactions. The second service 106*b* may need the location of the client device 109 to determine if the transaction is allowed. Therefore, before the first service 106*a* transmits the outgoing request 120 to the second service 106*b*, the first service 106*a* can request the context token 110.

At block 122, the authorization library 115 can attach the context token 110, which includes the location information, to a second header 112*b* of the outgoing request 120. The authorization library 115 can retrieve the context token 110 from the context storage 116 and attach the context token 110 in response to the first service 106*a* requesting the context token 110. At block 124, the first service 106*a* can transmit the outgoing request 120 to the second service 106*b*. The outgoing request 120 can be a request to determine if the client device 109 is located in an area that is authorized to perform the transaction. The second service 106*b* can fulfill the outgoing request 120 by determining that the location specified in the context token 110 is included in a list of locations authorized to perform transactions. Thus, the second service 106*b* can generate an output 128 that indicates that the location of the client device 109 is an authorized location for transactions.

At block 126, the first service 106*a* can receive the output 128 from the second service 106*b*. The first service 106*a* can use the output 128 to fulfill the incoming request 108 by generating a response 132. For example, the first service 106*a* can proceed with processing the requested transaction due to the location validation provided by the second service 106*b*. The response 132 can include confirmation details for the processed transaction. At block 130, the first service 106*a* can transmit the response 132 to the client device 109, thus fulfilling the incoming request 108.

Figure 2:
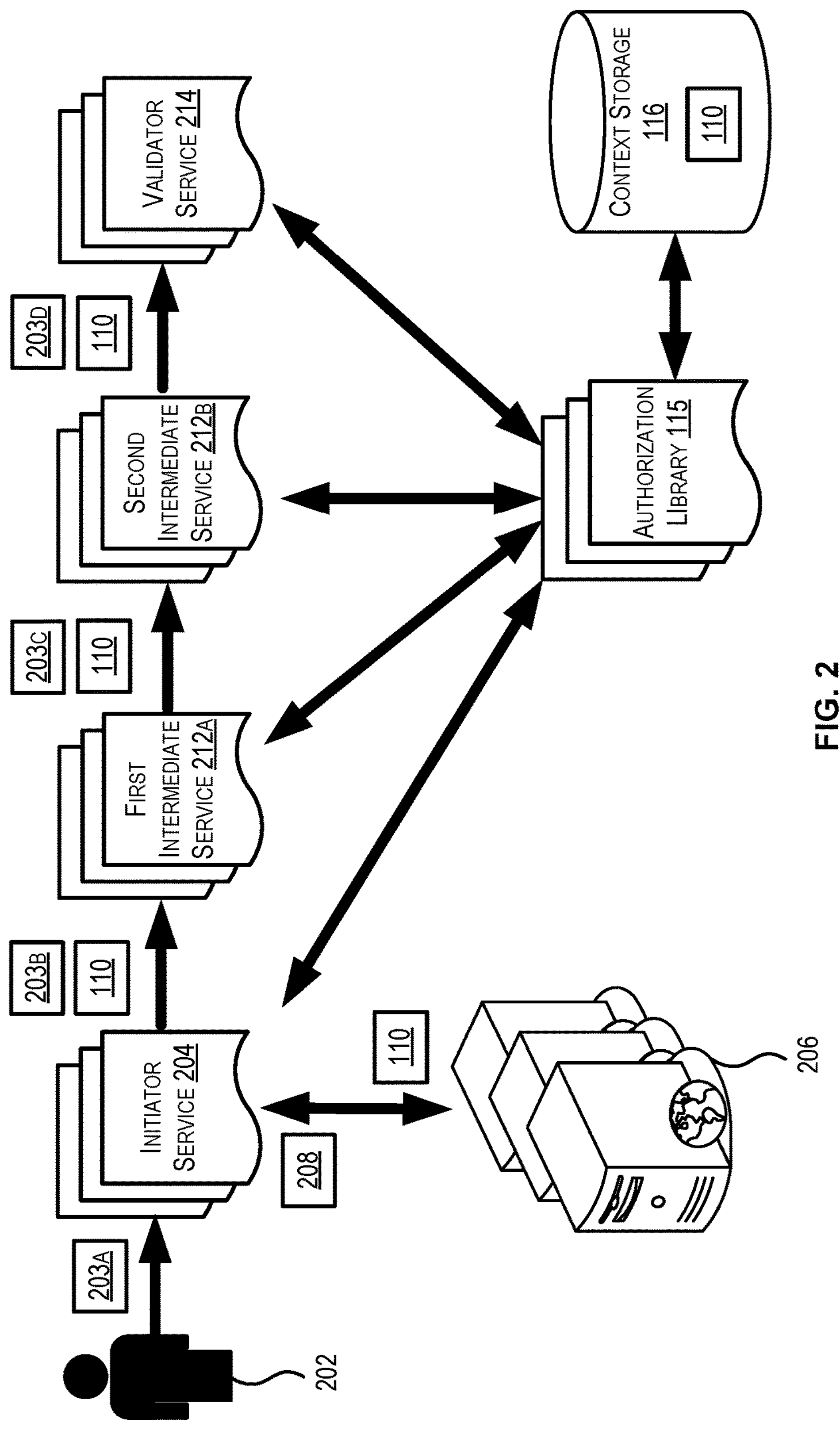
FIG. 2 illustrates an example block diagram of a system for propagating context tokens between services, according to at least one example.

FIG. 2 illustrates an example block diagram of a system 200 for propagating context tokens between services, according to at least one example. A user 202 can transmit a first resource request 203*a*, such as requesting access to a secure database, to an application. The first resource request 203*a* can be an example of an incoming request. The application can include multiple services that are chained together to fulfill requests, including an initiator service 204. The initiator service 204 can receive the first resource request 203*a*. But the initiator service 204 may be unable to provide the user 202 with access to the secure database. The initiator service 204 can determine that multiple services in the application can be used to fulfill the first resource request 203*a*. Such services may need contextual information to fulfill the first resource request 203*a*. So, the initiator service 204 can send a context request 208 to a context server 206 that stores context information. The context server 206 can transmit a context token 110 that includes context information for the first resource request 203*a* to the initiator service 204. The context information can include, for example, employee credentials for the user 202. The secure database may only be accessed by users with validated employee credentials. While FIG. 2 is described as relating to accessing a secure database with employee credentials, this is an example use case. In other examples, the system 200 may receive and process any other type of request from the user 202. The initiator service 204 can attach the context token 110 to a header of the first resource request 203*a*. The system 200 can also include an authorization library 115 and a context storage 116. The authorization library 115 can detect the context token 110 in the header and can automatically transmit the context token 110 to be stored in the context storage 116.

After receiving the context token 110 from the context server 206, the initiator service 204 can make a dependency call to a service that can fulfill the first resource request 203*a*. This can include two intermediate services 212*a-b* and a validator service 214. Each of the two intermediate services 212*a-b* and the validator service 214 may require the context token 110 to fulfill the dependency call. So, the initiator service 204 may request the context token 110 from the authorization library 115. The authorization library 115 can retrieve the context token 110 from the context storage 116 and attach the context token 110 to a header of a second resource request 203*b* generated by the initiator service 204. The second resource request 203*b* may be a dependency call to access a resource from the first intermediate service 212*a*. The initiator service 204. The initiator service 204 can then transmit the second resource request 203*b* to the first intermediate service 212*a*. As part of fulfilling the second resource request 203*b*, the first intermediate service 212*a* may need to make a dependency call to the third intermediate service 212*b*, which may similarly need to make a dependency call to the validator service 214 that can finish the process to fulfill the first resource request 203*a*. Both of the intermediate services 212*a-b* may therefore need the context token 110 attached to a third resource request 203*c* and a fourth resource request 203*d*, respectively. When requested, the authorization library 115 can retrieve the context token 110 from the context storage 116 and attach the context token 110 to headers of the resource requests 203*c-d*. The second intermediate service 212*b* can then transmit the fourth resource request 203*d* to the validator service 214. The validator service 214 may validate the employee credentials in the context token 110, and therefore provide the user 202 with access to the secure database.

Figure 3:
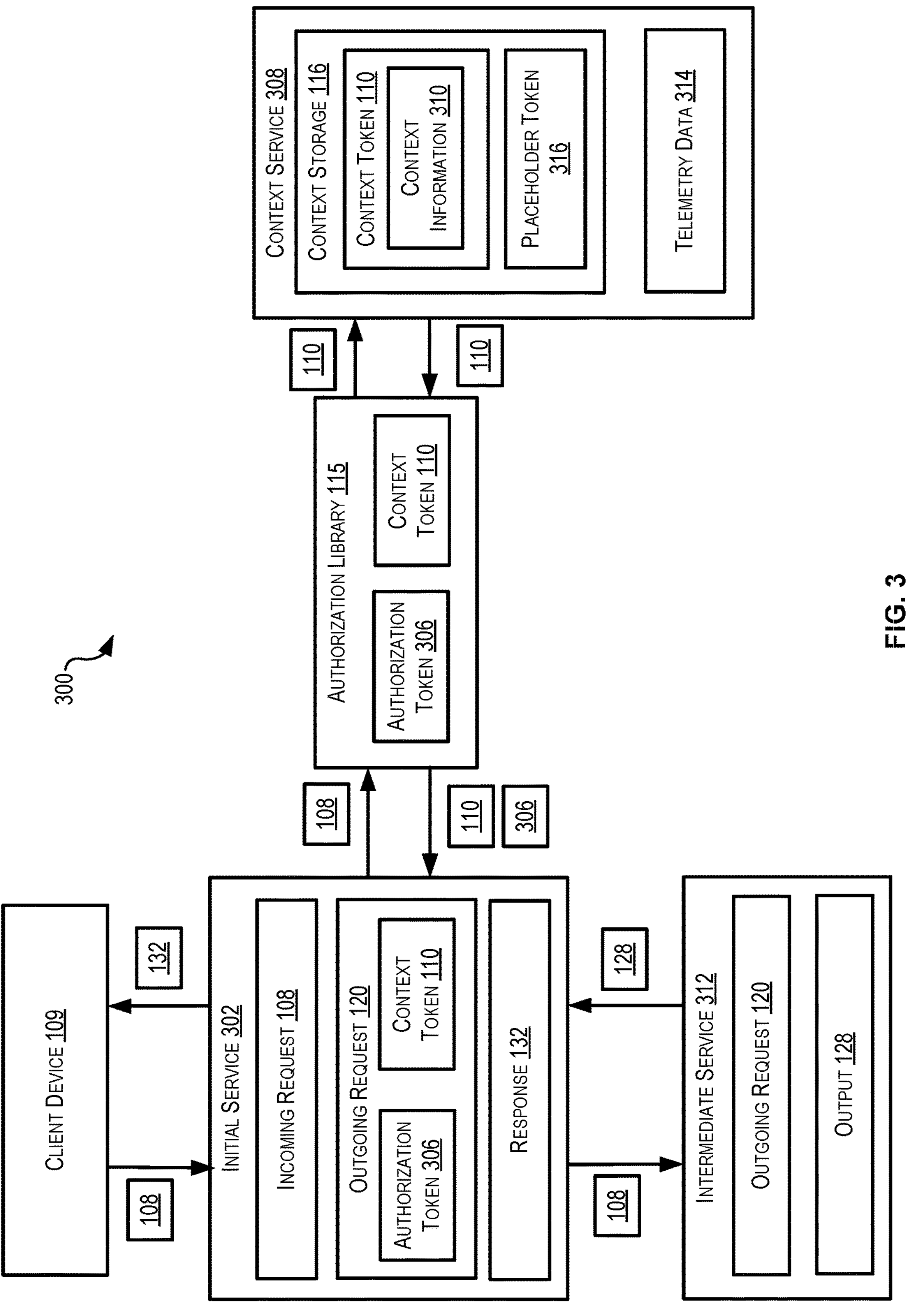
FIG. 3 illustrates an example block diagram of a system for propagating context tokens between services using an authorization library, according to at least one example.

Turning now to FIG. 3, this figure illustrates an example block diagram of a system 300 for propagating context tokens 110 between services using an authorization library 115, according to at least one example. The system 300 includes some elements from FIG. 1 (e.g., the client device 109, the authorization library 115, etc.). The client device 109 can transmit incoming requests 108 to an initial service 302. Incoming requests 108 received by the initial service 302 can be monitored by an authorization library 115. Typically, the authorization library 115 can inspect and modify headers of requests to retrieve and attach authorization tokens 306. The authorization tokens 306 can enable services to process incoming requests 108. In the system 300, the authorization library 115 can also detect and attach context tokens 110.

For example, when the initial service 302 receives the incoming request 108, the authorization library 115 can detect that a first header of the incoming request 108 includes an authorization token 306. The authorization token 306 can authorize the initial service 302 to process the incoming request 108. Based on detecting the authorization token 306, the authorization library 115 can intercept the incoming request 108. Then, the authorization library 115 can inspect the first header of the incoming request 108 to detect a context token 110. The context token 110 may include context information 310 related to the incoming request 108. This can include identification for the client device 109, an identification for a user associated with the client device 109, a type of user initiating the incoming request 108, a type of incoming request 108, or any other information associated with the client device 109, user, or incoming request 108. In some examples, the context token 110 can be present in the first header of the incoming request 108. In other examples, the authorization library 115 can detect context information 310 in the incoming request 108 and can generate a context token 110 indicating the context information 310. Alternatively, the initial service 302 may request generation of a context token 110 by a context service, and the authorization library 115 can detect the context token 110 after it is generated and attached to the header of the incoming request 108. In any case, the authorization library 115 can transmit the context token 110 to a context service 308. The authorization library 115 can also store the authorization token 306 in association with the context token 110 (e.g., with an indication of the incoming request 108 associated with the context token 110).

The context service 308 may include a context storage 116 in which context tokens 110 are stored. The context service 308 can store the context token 110 with an indication of the incoming request 108 associated with the context token 110. In some examples, the context service 308 may also generate the context token 110 based on context information 310 detected by the authorization library 115. If the incoming request 108 does not include context information 310, the context service 308 can store a placeholder token 316 in place of a context token 110.

The initial service 302 may not be configured to perform all functions needed to fulfill the incoming request 108. So, in some examples the initial service 302 may identify an intermediate service 312 that can be called upon to return a resource needed to fulfill the incoming request 108, or to perform an operation as part of fulfilling the incoming request 108. The initial service 302 can call on the intermediate service 312 with an outgoing request 120. The intermediate service 312 may need the context information 310 to fulfill the outgoing request 120. Before the initial service 302 transmits the outgoing request 120 to the intermediate service 312, the initial service 302 can request the context token 110 from the authorization library 115.

In response, the authorization library 115 can request the context token 110 from the context service 308. The context service 308 can identify the particular context token 110 that is associated with the incoming request 108 and provide that context token 110 to the authorization library 115. If the incoming request 108 did not include context information 310, the context service 308 can provide the placeholder token 316 to the authorization library 115. In some examples, the context service 308 may inspect the second header prior to providing the context token 110 to perform a duplication check. If the context service 308 determines that the outgoing request 120 does not yet include the context token 110, the context service 308 can provide the context token 110 to the authorization library 115. If the context service 308 determines that the second header already includes the context token 110, the context service 308 may not provide the context token 110 to the authorization library 115. The authorization library 115 can then attach the context token 110 or placeholder token 316 to a second header of the outgoing request 120. Additionally, the authorization library 115 may attach the authorization token 306 to the second header. Attaching the authorization token 306 can authorize the intermediate service 312 to participate in processing the incoming request 108.

The initial service 302 can then transmit the outgoing request 120, including the authorization token 306 and the context token 110, to the intermediate service 312. The initial service 302 can transmit the outgoing request 120 directly to the intermediate service 312 without using additional services to propagate the context token 110 to the intermediate service 312. The intermediate service 312, authorized by the authorization token 306, can generate an output 128 to the outgoing request 120. The output 128 can be generated based on the context information 310 in the context token 110. For example, if the outgoing request 120 involved requesting that the intermediate service 312 modify a webpage to display user information, the intermediate service 312 may identify and display user information included in the context token 110 as the output 128. In some examples, such as when the outgoing request 120 involves requesting a resource from the intermediate service 312, the intermediate service 312 can transmit the output 128 to the initial service 302. The initial service 312 can then generate a response 132 to the original incoming request 108 using the resource from the intermediate service 312.

In some examples, the context service 308 can additionally generate metrics and telemetry data 314 for the context tokens stored in the context storage 116. Metrics and telemetry data 314 can be generated each time a context token 110 is stored for an incoming request 108 and each time a context token 110 is retrieved for an outgoing request 120. Additionally, the context service 308 may update the context information 310 stored in the context token 110 in response to the intermediate service 312 generating the output 128. For example, if the output 128 involves validating a username and password provided by a user of the client device 109, the context service 308 may include an indication of the validation in the context information 310.

In some examples, the intermediate service 312 may determine that another service is needed to fulfill the outgoing request 120. Thus, the intermediate service 312 may also generate outgoing requests and request context tokens 110 from the context storage 116 via the authorization library 115. Such an example is further described in FIGS. 4-5.

Figure 4:
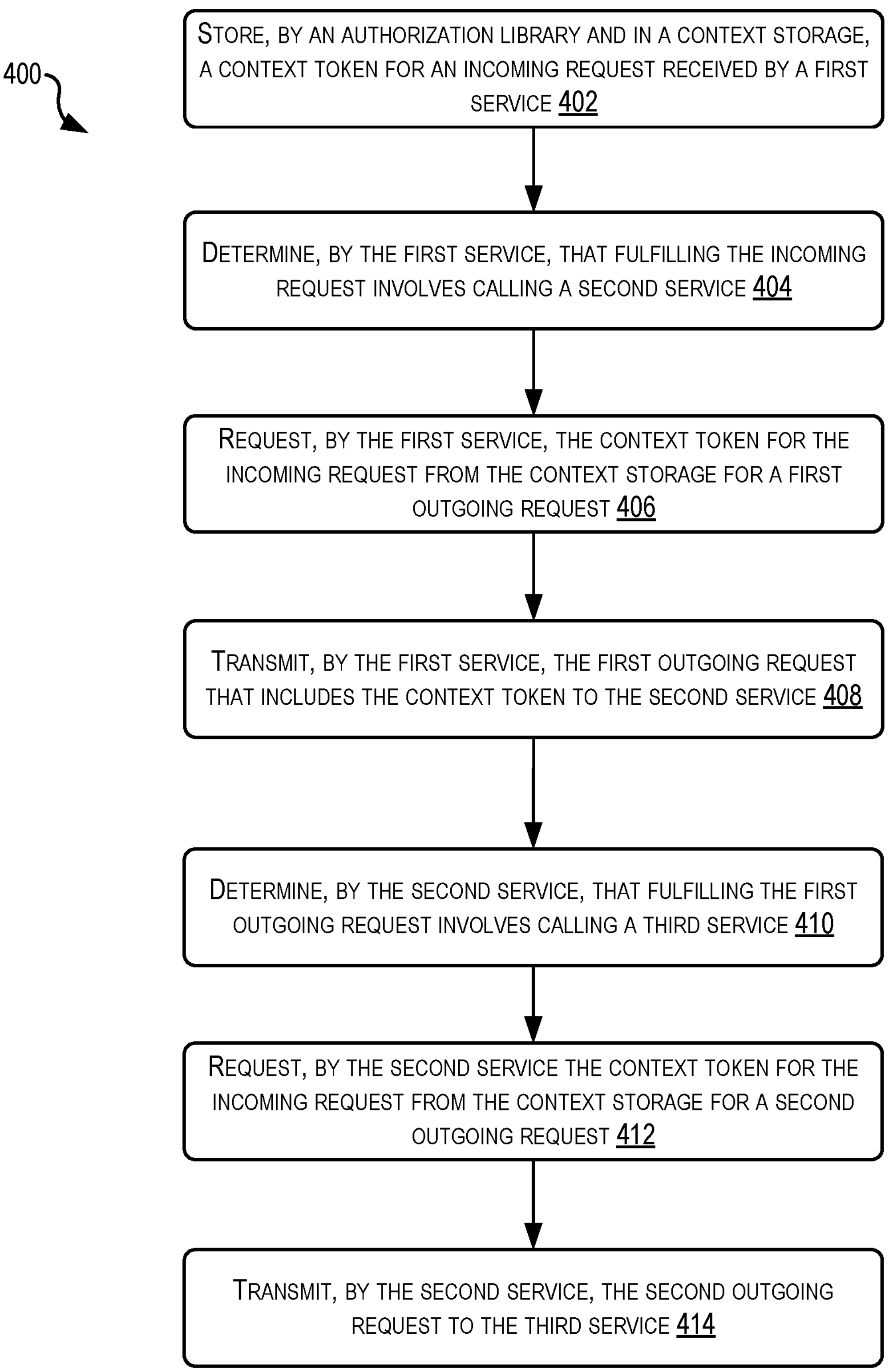
FIG. 4 is an example flowchart showing a process for implementing techniques relating to propagating context tokens between services, according to at least one example.

FIG. 4 illustrates an example flowchart showing a process 400 for implementing techniques related to propagating context between services, according to at least one example. In some examples, the system 100 of FIG. 1, the system 300 of FIG. 3, or a context propagation engine 710 of a system 702 of FIG. 7 may perform some or all parts of the process 400.

At block 402, the process 400 includes storing, by an authorization library and in a context storage, a context token for an incoming request. The context token can be received by a first service from a client device as part of a first header for the context token, or from another service that can generate the context token for the incoming request. The first service can execute a webpage that can run on the client device. The incoming request can be a request to change a password for a user account. A user can interact with the webpage on the client device to initiate the incoming request. The context token, which can be detected by an authorization library, can include a username, a current password, and a new password for the user account. The authorization library can transmit the context token to a context service, which can store the context token in a context storage. The context token can be stored as a local thread variable. This can prevent other, unrelated threads from accessing the context token.

At block 404, the process 400 includes the first service determining that fulfilling the incoming request involves calling a second service. For example, the first service may not be able to determine if the username and current password are valid authorization credentials. The first service may determine that a second service can validate the authorization credentials. The second service may need the context token (which includes the username and current password) to validate the authorization credentials.

At block 406, the process 400 includes the first service requesting the context token for the incoming request from the context storage for a first outgoing request to the second service. The first service can request the context token from the authorization library. The authorization library can request the context token from the context service. The context service can identify the context token associated with the local thread for the incoming request and provide the context token to the authorization library. The authorization library can then attach the context token to a second header of the first outgoing request. The first outgoing request can request that the second service validate the authorization credentials of the user and change the password to the new password.

At block 408, the process 400 involves the first service transmitting the first outgoing request that includes the context token to the second service. The second service can access the username and current password in the context token. If the second service determines that the username and current password are valid authorization credentials, the process 400 can continue to block 410. If the second service uses the context token to determine that the username and current password are not valid authorization credentials, the incoming request may be denied, and the user may not update the password. At block 410, the process 400 involves the second service determining that fulfilling the first outgoing request involves calling a third service. For example, the second service may be able to validate the current password but may not have necessary permissions for changing the password. The second service can identify a third service as being able to change the password. The third service may need the new password (which is present in the context token) to change the password. Additionally, the second service may request that the authorization library update the context token to indicate validation of the current authorization credentials. The authorization library can then transmit the updated context information to the context service, which can store the updated context information in the context token.

At block 412, the process 400 involves the second service requesting the context token for the incoming request from the context storage for a second outgoing request to the third service. The authorization library can request the context token from the context service. The context service can then provide the context token (which is updated to include the validation) to the authorization library. The authorization library can attach the context token to a third header of the second outgoing request. At block 414, the process 400 involves transmitting the second outgoing request to the third service.

Figure 5:
FIG. 5 is another example flowchart continuing the process for implementing techniques relating to propagating context tokens between services, according to at least one example.
Figure 5:
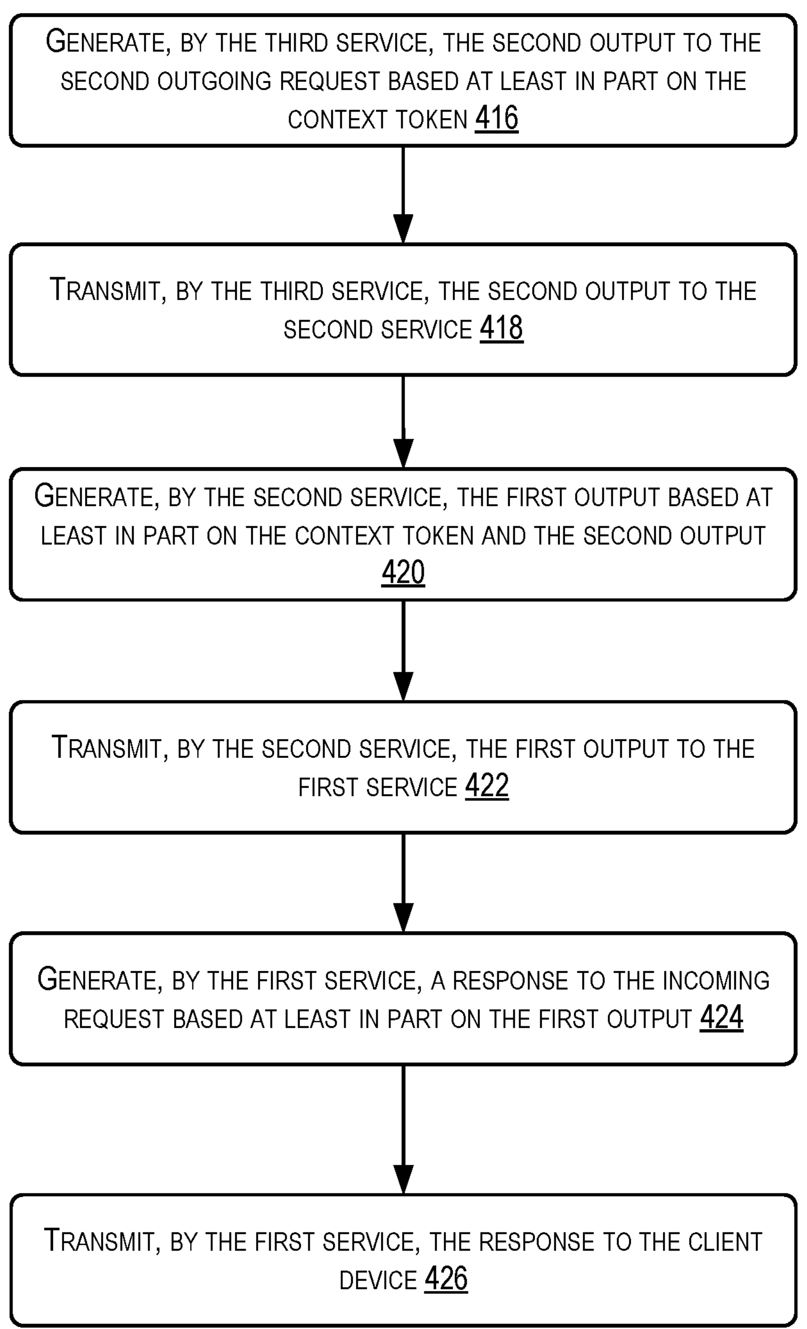

FIG. 5 illustrates another example flowchart continuing the process 400 for implementing techniques related to propagating context between services, according to at least one example.

At block 416, the process 400 involves the third service generating the second output to the second outgoing request based at least in part on the context token received in the second outgoing request. For example, the third service may have the permissions required to modify a database storing passwords for user accounts. Because the context token indicates that the current password is validated, the third service can modify an entry for the user account in the database. The password stored in the entry can be changed from the current password to the new password, which was included in the context token. The second output can include an indication that the password has been successfully updated. At block 418, the process 400 involves the third service transmitting the second output to the second service.

At block 420, the process 400 involves the second service generating the first output based at least in part on the context token and the second output received from the third service. For example, the first output can indicate that the authorization credentials were validated and that the password has been changed to the new password. At block 422, the process 400 involves the second service transmitting the first output to the first service.

At block 424, the process 400 involves the first service generating a response to the incoming request based at least in part on the context token and the first output received from the second service. The first service can modify the webpage to display the indication that the password has been successfully changed. Alternatively, if any of the services denied the incoming request based on the context token, the first service can modify the webpage to display an indication that the password has not been successfully changed. At block 426, the process 400 involves the first service transmitting the response to the client device to fulfill the incoming request. For example, the first service can transmit the modified webpage for display on the client device. The user can therefore be notified that their request to change their password has been fulfilled (or denied if the password change was not successful).

Figure 6:
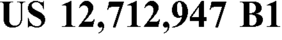
FIG. 6 is another example flowchart showing a process for implementing techniques relating to propagating context tokens between services, according to at least one example.
Figure 6:
Figure 6:
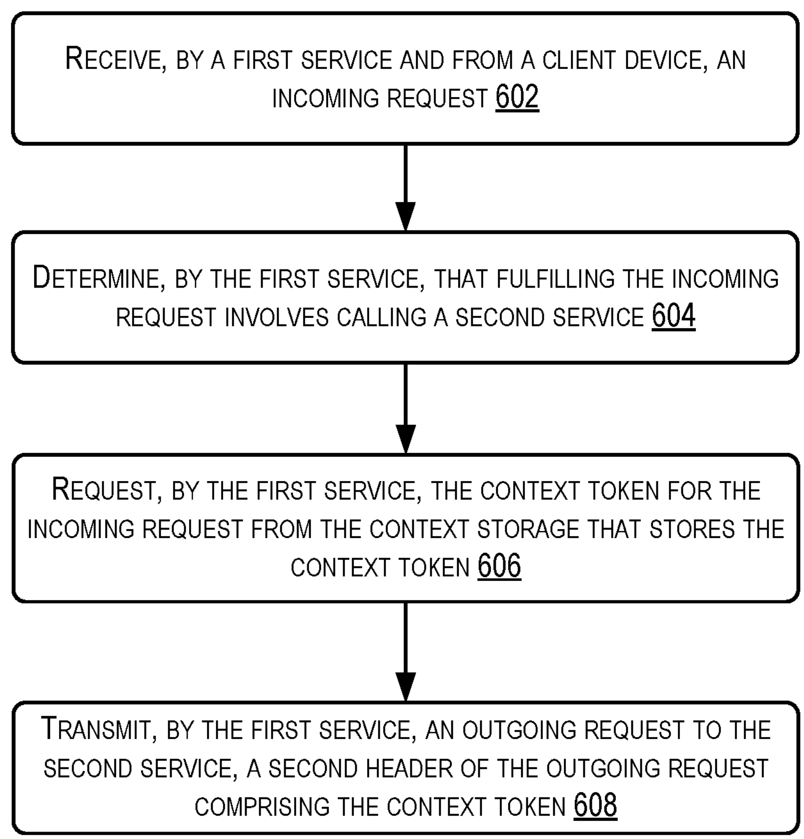

FIG. 6 illustrates another example flowchart showing a process 600 for implementing techniques related to propagating context between services, according to at least one example. In some examples, the system 100 of FIG. 1, the system 300 of FIG. 3, or the context propagation engine 710 of the system 702 of FIG. 7 may perform some or all parts of the process 600.

At block 602, the process 600 includes receiving, by a first service and from a first client device, an incoming request. The incoming request can include a first header that includes a context token. The context token can include context information. The context information can include at least one of an identification of the client device, a location of the client device, a username associated with a user of the client device, a type of user, and a type of incoming request. A context storage can store the context token responsive to detecting context information for the incoming request in the context token.

In some examples, storing the context token in the context storage can involve detecting an absence of context information for the incoming request in the first header. Responsive to detecting the absence of context information in the first header, a placeholder token can be stored in the context storage as the context token for the incoming request. In some examples, the context token may be a part of a plurality of context tokens stored in the context storage for a plurality of incoming requests.

The incoming request may not include the context token. In such examples, context information may be detected in the incoming request. A context token can be generated for the incoming request based on the context information. Responsive to generating the context token, the generated context token can be stored in the context storage.

In some examples, responsive to the first service receiving the incoming request, an authorization library can intercept the incoming request. The incoming request can be intercepted based on detecting an authorization token in the first header of the incoming request. The authorization token can authorize the first service to fulfill the incoming request. The authorization library can then detect the context token in the first header of the incoming request. The context token can be transmitted to the context storage by the authorization library. In some examples, the authorization library may store the authorization token in association with the context token.

At block 604, the process 600 includes determining, by the first service, that fulfilling the incoming request involves calling a second service. Calling the second service can involve transmitting an outgoing request to the second service. At block 606, the process 600 includes, responsive to determining that fulfilling the incoming request involves calling the second service, requesting, by the first service, the context token for the incoming request from the context storage. The context token can then be received from the context storage. The context token can be requested prior to transmitting the outgoing request to the second service. In examples where context information was not detected in the first header and the placeholder token was stored in context storage as the context token, the placeholder token can be attached to the second header of an outgoing request to the second service responsive to requesting the context token for the incoming request. In other examples, the context token can be attached to the second header responsive to requesting the context token for the incoming request.

In some examples, responsive to requesting the context token for the incoming request from the context storage, the context token of the plurality of context tokens stored in the context storage can be identified. For example, the incoming request associated with the outgoing request to the second service can be determined. And, the context token associated with the incoming request in the plurality of context tokens stored in the context storage can be identified. In some examples, telemetry data can be generated for the context token responsive to (i) storing the context token in the context storage, (ii) requesting the context token from the context storage, and (iii) attaching the context token to the outgoing request.

In some examples, responsive to requesting the context information, the authorization library may attach the authorization token and the context token for the incoming request to the second header of the outgoing request to the second service. The authorization token may authorize the second service to fulfill the outgoing request. Additionally, the authorization library may determine that the second header of the outgoing request does not include the context token. In response, the context token can be provided to the authorization library. The authorization library can then attach the context token to the second header of the outgoing request.

At block 608, the process 600 includes transmitting, by the first service, the outgoing request to the second service. A second header of the outgoing request can include the context token. The second service can generate an output for the outgoing request based at least in part on the context token. The second service can then transmit the output to the first service. The first service can generate a response to the incoming request based at least in part by the output from the second service and the context token. The first service can then transmit the response to the client device.

Figure 7:
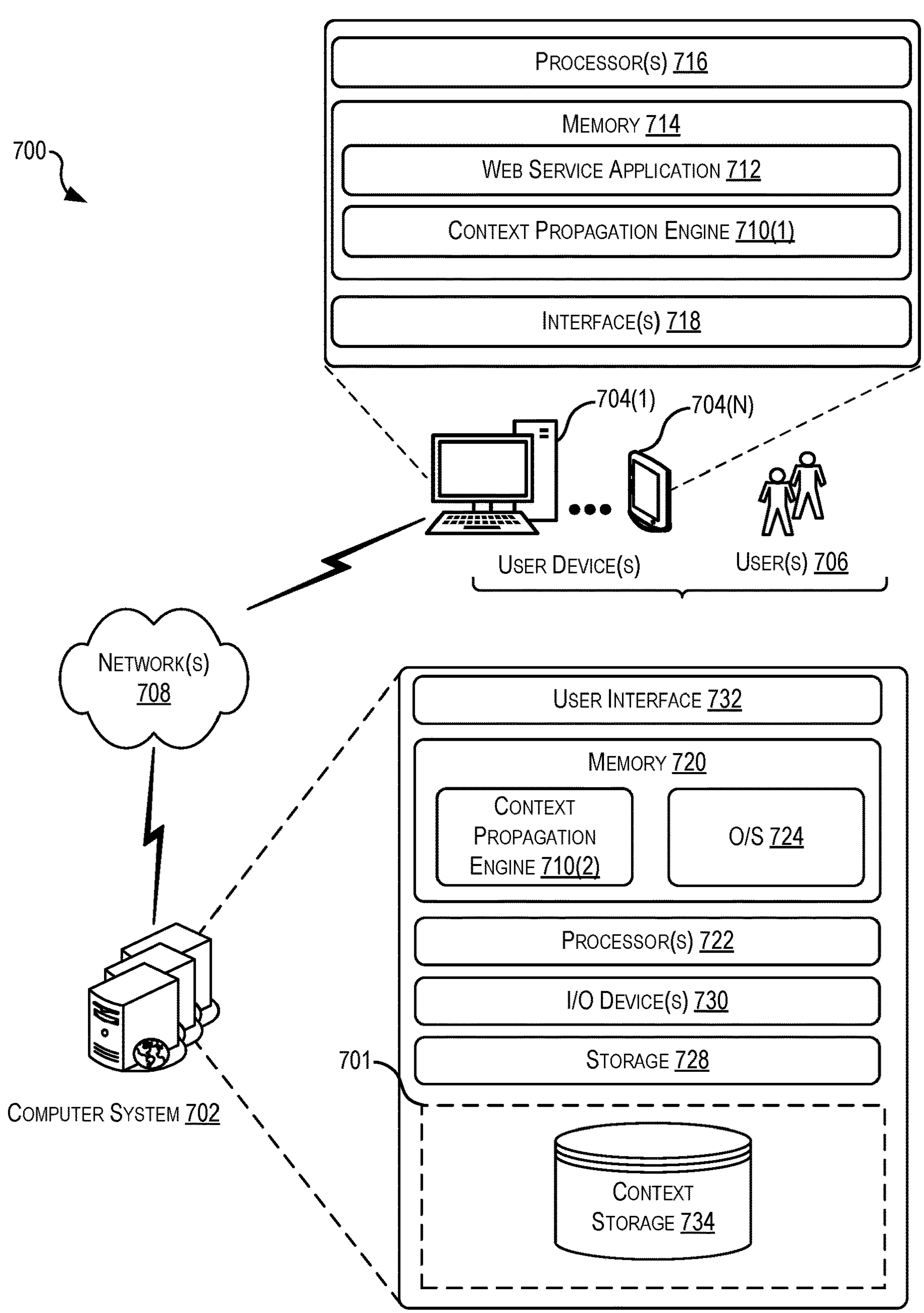
FIG. 7 illustrates an example schematic architecture for implementing techniques relating to propagating context tokens between services, according to at least one example.

FIG. 7 illustrates an example schematic architecture 700 for implementing techniques relating to propagating context tokens between services, according to at least one example. The architecture 700 may include a computer system 702 (e.g., the system 100 or system 300 described herein) in communication with one or more user devices 704(1)-704(N) (e.g., the client device 109 described herein) via one or more networks 708 (hereinafter, "the network 708").

The user device 704 may be operable by one or more users 706 to interact with the computer system 702. The user device 704 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 704(1) is illustrated as a desktop computer, while the user device 704(N) is illustrated as an example of a handheld mobile device.

The user device 704 may include a memory 714 and processor(s) 716. In the memory 714 may be stored program instructions that are loadable and executable on the processor(s) 716, as well as data generated during the execution of these programs. Depending on the configuration and type of user device 704, the memory 714 may be volatile (such as random access memory ("RAM")) and/or non-volatile (such as read-only memory (ROM), flash memory, etc.).

In some examples, the memory 714 may include a web service application 712 and a version of a context propagation engine 710 (e.g., 710(1)). The web service application 712 and/or the context propagation engine 710(1) may allow the user 706 to interact with the computer system 702 via the network 708. The user device 704 may also include one or more interfaces 718 to enable communication with other devices, systems, and the like. The context propagation engine 710(1), whether embodied in the user device 704 or the computer system 702, may be configured to perform the techniques described herein. For example, the context propagation engine 710 can include a network of services that can receive and fulfill requests and an authorization library that can retrieve context tokens from and attach context tokens to request headers. In an example, the context propagation engine 710 can include any other suitable devices, engines, modules, models, and the like.

Turning now to the details of the computer system 702, the computer system 702 may include one or more computer system computers, perhaps arranged in a cluster of servers or as a server farm, and may host web service applications. The function of the computer system 702 may be implemented a cloud-based environment such that individual components of the computer system 702 are virtual resources in a distributed environment.

The computer system 702 may include at least one memory 720 and one or more processing units (or processor(s)) 722. The processor 722 may be implemented as appropriate in hardware, computer-executable instructions, software, firmware, or combinations thereof. Computer-executable instruction, software, or firmware implementations of the processor 722 may include computer-executable or machine-executable instructions written in any suitable programming language to perform the various functions described. The memory 720 may include more than one memory and may be distributed throughout the computer system 702. The memory 720 may store program instructions that are loadable and executable on the processor(s) 722, as well as data generated during the execution of these programs. Depending on the configuration and type of memory including the computer system 702, the memory 720 may be volatile (such as RAM and/or non-volatile (such as read-only memory ("ROM"), flash memory, or other memory)). The memory 720 may include an operating system 724 and one or more application programs, modules, or services for implementing the features disclosed herein including at least a version of the context propagation engine 710 (e.g., 710(2)). For example, the context propagation engine 710(2) may perform the functionality described herein.

The computer system 702 may also include additional storage 728, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 728, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 702 and/or part of the user device 704.

The computer system 702 may also include input/output (I/O) device(s) and/or ports 730, such as for enabling connection with a keyboard, a mouse, a pen, a voice input device, a touch input device, a display, speakers, a printer, or other I/O device.

In some examples, the computer system 702 may also include one or more user interface(s) 732. The user interface 732 may be utilized by an operator, curator, or other authorized user to access portions of the computer system 702. In some examples, the user interface 732 may include a graphical user interface, voice interfaces, web-based applications, programmatic interfaces such as APIs, or other user interface configurations.

The computer system 702 may also include a data store 701. In some examples, the data store 701 may include one or more databases, data structures, or the like for storing and/or retaining information associated with the computer system 702 and which, in some examples, may be accessible by the user devices 704. The context propagation engine 710 is communicatively coupled (e.g., via a wired connection or a wireless connection) to the data store 701. The data store 1701 includes a context storage 734. In an example, the data store 701 can include any other suitable data, databases, libraries, and the like. The context storage 734 can include context information, such as context tokens for incoming requests.

Figure 8:
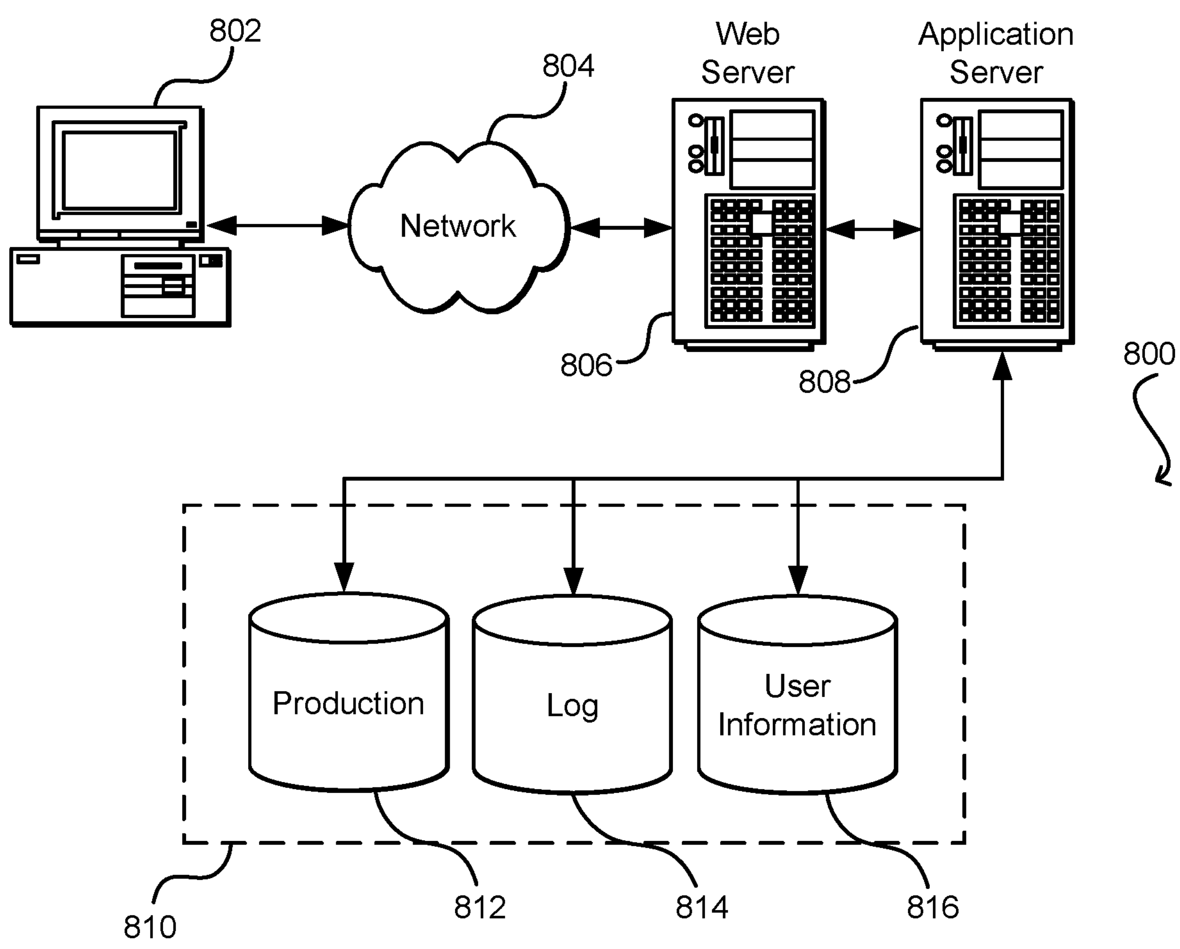
FIG. 8 illustrates an example schematic environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, by a first service and from a client device, an incoming request, wherein an authorization library for the first service is configured to intercept the incoming request and store a context token from a first header of the incoming request in context storage;

determining, by the first service, that fulfilling the incoming request involves calling a second service that uses the context token;

responsive to determining that fulfilling the incoming request involves calling the second service, requesting, by the first service and from the authorization library, the context token for the incoming request from the context storage configured to store the context token, the authorization library being configured to attach the context token to an outgoing request responsive to the requesting; and transmitting, by the first service, the outgoing request to the second service, a second header of the outgoing request comprising the context token, the second service being configured to generate an output for the outgoing request based at least in part on the context token.

2. The computer-implemented method of claim 1, further comprising:

generating, by the first service, a response to the incoming request based at least in part by the output from the second service and the context token; and transmitting, by the first service, the response to the client device.

3. The computer-implemented method of claim 1, wherein the context token includes context information comprising at least one of an identification of the client device, a location of the client device, an identification of a user associated with the client device, a type of user, and a type of incoming request.

4. The computer-implemented method of claim 1, wherein the authorization library is configured to, responsive to the first service receiving the incoming request:

detecting context information for the incoming request in the context token; and responsive to detecting the context information in the context token, storing the context token in the context storage.

5. The computer-implemented method of claim 1, further comprising, responsive to receiving the incoming request:

detecting an absence of context information for the incoming request in the first header; and responsive to detecting the absence of context information in the first header, storing a placeholder token in the context storage as the context token for the incoming request.

6. The computer-implemented method of claim 5, further comprising responsive to requesting the context token for the incoming request, attaching the placeholder token to the second header of the outgoing request.

7. The computer-implemented method of claim 1, wherein the context token is part of a plurality of context tokens stored in the context storage for a plurality of incoming requests, and wherein the method further comprises, responsive to requesting the context token for the incoming request from the context storage:

identifying the context token of the plurality of context tokens stored in the context storage by:

determining the incoming request associated with the outgoing request to the second service; and identifying the context token associated with the incoming request in the plurality of context tokens stored in the context storage.

8. The computer-implemented method of claim 1, further comprising generating telemetry data for the context token responsive to (i) storing the context token in the context storage, (ii) requesting the context token from the context storage, and (iii) attaching the context token to the outgoing request.

9. The computer-implemented method of claim 1, wherein the incoming request does not include the context token, and wherein the computer-implemented method further comprises:

detecting context information in the incoming request;

generating the context token for the incoming request based on the context information; and responsive to generating the context token, storing the context token in the context storage.

10. A system, comprising:

one or more memories configured to store computer-executable instructions; and one or more processors configured to access the one or more memories and execute the computer-executable instructions to at least:

receive, by a first service and from a client device, an incoming request, wherein an authorization library for the first service is configured to intercept the incoming request and store a context token from a first header of the incoming request in context storage;

determine, by the first service, that fulfilling the incoming request involves calling a second service that uses the context token;

responsive to determining that fulfilling the incoming request involves calling the second service, request, by the first service and from the authorization library, the context token for the incoming request from the context storage configured to store the context token, the authorization library being configured to attach the context token to an outgoing request responsive to the requesting; and transmit, by the first service, the outgoing request to the second service, a second header of the outgoing request comprising the context token, the second service being configured to generate an output for the outgoing request based at least in part on the context token.

11. The system of claim 10, wherein the one or more memories are configured to store additional computer-executable instructions that when executed by the one or more processors cause the one or more processors to:

generate, by the first service, a response to the incoming request based at least in part by the output from the second service and the context token; and transmit, by the first service, the response to the client device.

12. The system of claim 10, wherein the context token includes context information comprising at least one of an identification of the client device, a location of the client device, an identification of a user associated with the client device, a type of user, and a type of incoming request.

13. The system of claim 10, wherein the authorization library is configured to, responsive to the first service receiving the incoming request:

detecting context information for the incoming request in the context token; and responsive to detecting the context information in the context token, storing the context token in the context storage.

14. The system of claim 10, wherein the one or more memories are configured to store additional computer-executable instructions that when executed by the one or more processors cause the one or more processors to, responsive to receiving the incoming request:

detect an absence of context information for the incoming request in the first header; and responsive to detecting the absence of context information in the first header, store a placeholder token in the context storage as the context token for the incoming request.

15. One or more non-transitory computer-readable storage media comprising computer-executable instructions that, when executed by one or more processors of a computer system, cause the computer system to perform operations comprising:

storing, by an authorization library for a first service, a context token from a first header of an incoming request received from a client device in context storage, the incoming request received by the first service, the context token comprising context information for the incoming request, the authorization library being configured to intercept the incoming request;

determining, by the first service, that fulfilling the incoming request involves calling a second service that uses the context token;

responsive to determining that fulfilling the incoming request involves calling the second service, requesting, by the first service and from the authorization library, the context token for the incoming request from the context storage, the authorization library being configured to attach the context token to an outgoing request responsive to the requesting; and transmitting, by the first service, the outgoing request to the second service, a second header of the outgoing request comprising the context token, the second service being configured to generate an output for the outgoing request based at least in part on the context information in the context token.

16. The one or more non-transitory computer-readable storage media of claim 15, further comprising computer-readable instructions that, when executed by the one or more processors, cause the one or more processors to perform operations comprising:

determining, by the second service, that fulfilling the outgoing request involves calling a third service, wherein the outgoing request is a first outgoing request and the output is a first output; and responsive to determining that fulfilling the outgoing request involves calling the third service, requesting, by the second service and from the authorization library, the context token for the incoming request from the context storage, the authorization library being configured to return the context token for a second outgoing request responsive to the requesting.

17. The one or more non-transitory computer-readable storage media of claim 16, further comprising computer-readable instructions that, when executed by the one or more processors, cause the one or more processors to perform operations comprising:

responsive to determining that fulfilling the outgoing request involves calling the third service, generating, by the second service, the second outgoing request to the third service;

receiving, by the second service, the context token from the authorization library;

determining that the second outgoing request does not comprise the context token;

responsive to determining that the second outgoing request does not comprise the context token, attaching the context token to a third header of the second outgoing request; and transmitting the second outgoing request comprising the context token to the third service, the third service configured to generate a second output to the second outgoing request based at least in part on the context token.

18. The one or more non-transitory computer-readable storage media of claim 17, further comprising computer-readable instructions that, when executed by the one or more processors, cause the one or more processors to perform operations comprising:

generating, by the third service, the second output comprising a denial of the second outgoing request based at least in part on the context token; and generating, by the first service, a response to the incoming request comprising a denial of the incoming request based at least in part on the denial of the second outgoing request.

19. The one or more non-transitory computer-readable storage media of claim 17, further comprising computer-readable instructions that, when executed by the one or more processors, cause the one or more processors to perform operations comprising:

receiving, by the second service, the second output from the third service;

generating, by the second service, the first output for the first service based at least in part on the context token and the second output from the third service; and transmitting, by the second service, the first output to the first service.

20. The one or more non-transitory computer-readable storage media of claim 19, further comprising computer-readable instructions that, when executed by the one or more processors, cause the one or more processors to perform operations comprising:

receiving, by the first service, the first output from the second service;

generating, by the first service, a response to the incoming request based at least in part on the context token and the first output from the second service; and transmitting, by the first service, the response to the client device.

* * * * *